Figure 1:
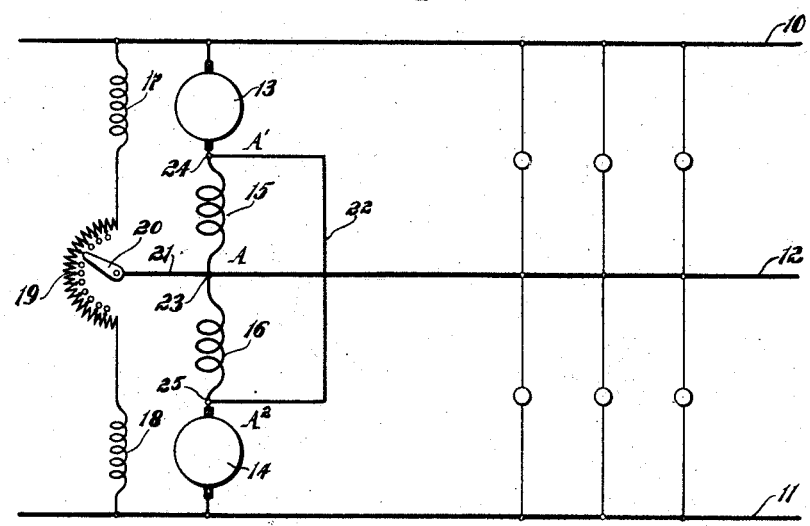

No. 883,760. PATENTED APR. 7, 1908.
L. L. TATUM.
SYSTEM OF DISTRIBUTION.
APPLICATION FILED FEB. 19, 1906.

WITNESSES:
George J. Schwartz
Fred J. Kinney

INVENTOR:
Lewis L. Tatum.
By
Chas. E. Lord
ATTORNEY.

UNITED STATES PATENT OFFICE.

LEWIS L. TATUM, OF NORWOOD, OHIO, ASSIGNOR TO THE BULLOCK ELECTRIC MANUFACTURING COMPANY, A CORPORATION OF OHIO.

SYSTEM OF DISTRIBUTION.

No. 883,760.      Specification of Letters Patent.      Patented April 7, 1908.

Application filed February 19, 1906. Serial No. 301,819.

*To all whom it may concern:*

Be it known that I, LEWIS L. TATUM, citizen of the United States, residing at Norwood, in the county of Hamilton and State of Ohio, have invented certain new and useful Improvements in Systems of Distribution, of which the following is a full, clear, and exact specification.

My invention relates to multiple-voltage systems of distribution in which balancers, as they are called in the art, are employed for supplying current to the branches of the system which carry the heaviest currents to maintain the voltages of the branches at their proper predetermined values.

Although not limited to three wire multiple-voltage systems, my invention relates especially to multiple-voltage systems having two branches or three conductors in which the voltages between either main conductor and the neutral or compensating conductor are equal, frequently called symmetrical three-wire systems, or to those multiple-voltage three-wire systems in which the voltages between either main conductor and the compensating conductor are intentionally made unequal, called unsymmetrical three-wire systems.

In practice, the voltages across the two branches of a three wire multiple voltage system usually have not their proper relative values unless some special means is provided for maintaining such values, and it is a difficult matter to maintain these voltages constant for all loads and for all speeds of the balancer. In other words, if the voltages between the respective main conductors and the compensating conductor are of certain definite values when the currents are balanced, these voltages usually vary somewhat as the currents become unbalanced and may be slightly different for different loads on the system.

The voltages between the main conductors and the compensating conductor of a system can be maintained nearly at their theoretical values, if the balancer or balancers consist of good regulating machines. On account of the good inherent regulating qualities of compound-wound machines, they are preferably used for this purpose. It is evident that the fields of the compound-wound machine acting as a generator must be cumulative and since the current through the machine acting as a generator is opposite in direction to that when the machine is acting as a motor, it follows that when the machine is acting as a motor and is driving the other machine as a generator, the motor has differential fields. It is well known that a differentially wound motor is liable to run away on current overload. The same is true of compound-wound balancers for the reason that the machine acting as a motor has differential field windings.

One of the objects of my invention is to provide improved means whereby the voltages between the main conductors and neutral or compensating conductor at any condition of load can be made exactly the same as at the condition of no load whether the currents on the two sides of the system are balanced or unbalanced, and whereby the field strengths of the two machines of the balancer can be relatively varied.

Another object of my invention is to provide means whereby the danger of a compound-wound balancer running away is lessened.

A further object is to provide means for conveniently connecting two or more balancers in parallel to the same system of distribution.

In carrying out the first part of my invention, I insert a rheostat between the shunt windings of two machines, and connect the rheostat arm to the armature circuit between the armatures of the balancer.

In carrying out another part of my invention, I arrange the windings of the balancers so that two series windings are directly connected to each other and to a neutral or compensating conductor of the system and provide a low resistance shunt around the two series windings.

In carrying out still another part of my invention, I connect two balancers in parallel to the distributing system, the series windings of each balancer being directly connected together and to the neutral conductor, and being shunted by a low resistance conductor, and I connect these low resistances shunting conductors by a single conductor or equalizer, whereby one of the usual equalizers is dispensed with.

Figure 2:
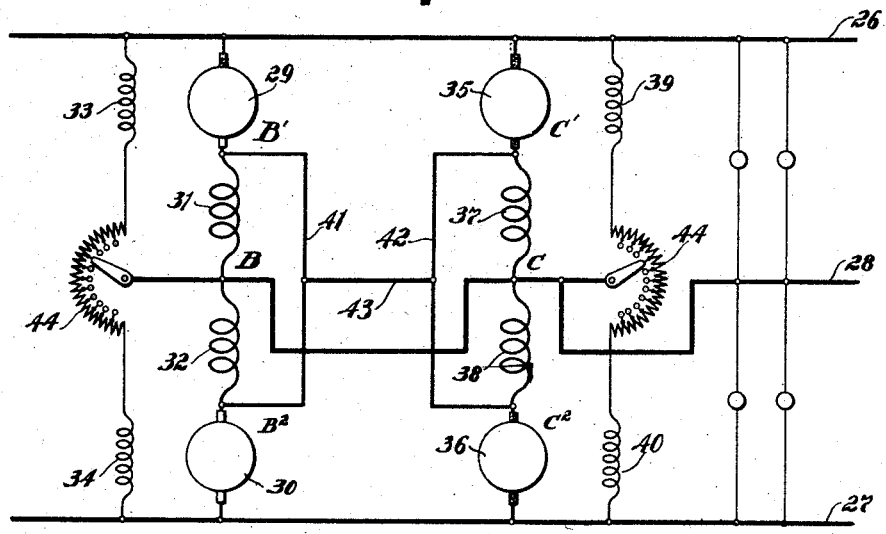

For a better understanding of my invention, reference is had to the accompanying drawing, in which Figure 1 is a diagram of a three-wire system in which a single balancer is employed for supplying the balancing current; and Fig. 2 is a diagram of a three-wire system in which two balancers are connected in parallel.

Referring now to Fig. 1 of the drawing, I have shown at 10 and 11 the main conductors or legs of a three wire multiple voltage system of distribution either of the symmetrical or unsymmetrical type, and at 12 the neutral or compensating conductor. Connected across the legs of the system is a compound-wound balancer A, consisting of two dynamo-electric machines A' and A², having respectively armatures 13 and 14, series field windings 15 and 16, and shunt field windings 17 and 18. The two armatures are arranged to rotate together, as by being mounted on a common shaft, and are connected directly to the legs 10 and 11, and to the series windings 15 and 16, which latter are connected directly to each other and at their point of junction to the neutral or compensating conductor 12. The shunt field windings are in this case arranged in series relation, that is, are in a single circuit across the legs or main conductors. Between the shunt windings and in the circuit thereof I arrange a rheostat having resistance elements 19, and a pivoted rheostat arm 20 adapted to engage the resistance contacts. This rheostat arm I connect to the armature circuit between the two armatures, at one or more points. In this case the rheostat arm is connected by a conductor 21 to the armature circuit at a single point, which is the point of junction 23 of the series windings and compensating conductor. The object of so arranging the rheostat in the shunt circuit and so connecting the rheostat arm to the armature circuit will now be explained.

As was stated above, it is a difficult matter even with the best regulating machines to maintain the potential of the neutral or compensating conductor at its proper value relative to the main conductor when the load varies and when the currents in the two sides of the system are equal. If the voltage between a main conductor and the compensating conductor at one load or when the currents are balanced is a certain amount, it will usually vary somewhat as the load changes or the currents become unbalanced.

It may be desired to adjust the balancing effect under certain conditions of load or to raise or lower the relative potential of the neutral or compensating conductor. This can be done by shifting the rheostat arm 20. It is seen that if the rheostat arm is moved upward from its central position to the position shown in Fig. 1, the ohmic resistance of the shunt field circuit between the conductor 10 and the rheostat arm is lessened while the ohmic resistance of the shunt field circuit between the rheostat arm and the conductor 11 is increased. The result is that proportionately more current passes through the shunt winding 17 than through the shunt winding 18, and therefore, if the current between the conductors 10 and 12 is greater than that between conductors 12 and 11, and machine A' is acting as a generator to maintain the compensating conductor at its proper relative potential, the voltage developed by A' is increased, for the reason that the generator shunt field 17 is increased and the motor shunt field 18 is decreased. Increasing the shunt field of the generator increases the voltage of the generator and hence the voltage of the side carrying the greater current, while at the same time decreasing the shunt field of the motor tends to increase the speed of the balancer and therefore to increase the voltage of the generator and the voltage of its associated side of the system. In a similar manner, if the rheostat arm is shifted downward, shunt field 17 will be decreased and shunt field 18 will be increased and the effect upon the voltage between conductors 10 and 12 will be just the opposite. Another function of the rheostat connected as shown to the shunt windings and to the neutral conductor, is that an equalization or other proper adjustment of the magnetic fields can be obtained. It sometimes happens in symmetrical systems, where the machines of the balancer should be alike, that the field of the one of the machines is not wound exactly as the field of the other machine is wound, or in either the symmetrical or unsymmetrical system the reluctance of the magnetic circuit of one of the machines may be relatively greater than that of the other machine, or the machines may be dissimilar in other ways, resulting in one machine having under ordinary conditions a field comparatively too strong. This might result in unsatisfactory operation. By shifting the rheostat arm 20 the fields of the two machines can be made of proper intensity. And if the two machines are otherwise similar the inherent regulation will be the same no matter which side of the system carries the greater current. I have shown this feature of my invention applied to a compound wound balancer. It should be understood that it can be likewise employed with equal advantage to a shunt wound balancer.

The arrangement of the regulating resistance in the shunt circuit as shown has a decided advantage over any other arrangement previously employed. With the resistance between the shunt windings and connected to the compensating conductor, the sum of the field strengths remains approximately constant and excessive changes in speed of the balancer due to a weakening or strengthening of the fields of both machines by hand regulation, as might happen if a separate rheostat were used for the shunt field winding of each machine, is avoided. The total ohmic resistance of this rheostat can be comparatively small.

As was stated above, if the balancer consists of two ordinary compound-wound machines, there is some danger of the balancer running away if the currents are unbalanced, especially if they are unbalanced to a considerable degree, on account of the differential field action of the motor. Now since the motor of the balancer must drive the generator when the currents are unbalanced, it must of course take more current to provide for the losses of both machines. Consequently, as ordinarily constructed more current passes through the series field of the motor than through the series field of the generator.

In order to increase the cumulative effect of the fields of the generator and to decrease the differential field effect of the motor, and hence to lessen the danger of the balancer running away and yet to increase the voltage of the generator of the balancer upon a certain unbalancing of the currents, I arrange and connect the series fields as shown, and as will now be described more in detail. The two series fields are directly connected together between the armatures 13 and 14, which armatures are directly connected respectively to the legs 10 and 11, the neutral or compensating conductor 12 being connected at the middle point 23 of the two series windings 15 and 16. Connected at 24 to a point between the armature 13 and series field 15 and at 25 to a point between armature 14 and series field 16, is a low resistance conductor 22. When the currents taken by the two sides of the system are balanced, it is evident that practically no current passes through the series windings but that the current is shunted by the conductor 22. Now assuming again that the current between conductors 10 and 12 is greater than that between conductors 12 and 11, if the low resistance shunt 22 were not provided more current would pass through the series winding 16 of the motor of the balancer than through the winding 15 of the generator of the balancer. But since the series fields are shunted by the low resistance conductor, the potentials of the points on each machine to which the conductor is attached, in other words, the potentials of the points between each armature and its series field, are substantially the same for both machines. The result is that current flowing along the neutral or compensating conductor toward the balancer will divide proportionately at the point 23 of the attachment of the neutral conductor and the series windings, increasing the amount which would otherwise have gone through the generator series winding 15, and decreasing the amount which would otherwise have gone through the series winding 16 of the motor. At the point 24, that is, at the point of connection of the conductor 22 to the machine A', the current again divides and the proper amount of current which should be taken by the generator will pass through the generator armature 13, and the remainder of the current in the winding 15 will pass by conductor 22 to the point 25, that is, to the point of connection of conductor 22 to the machine $A^2$, and thence through the motor armature. Thus, each armature is supplied with the proper amount of current and the effect of the conductor 22 is to merely change the relative amounts of current passing through the series fields 15 and 16.

Under certain circumstances, it may be desirable to operate two or more balancers in parallel on the same system. This is especially true if the load on the system and the degree of unbalancing vary greatly at different times. For example, suppose that at times only a slight unbalancing occurs, in which case a comparatively small balancer would be sufficient to supply the balancing current to the side carrying the heavier currents. If however, at another period the unbalancing is very great, then a larger balancer or even two balancers may be required to supply the balancing current to one of the sides of the system, and one or more balancers of sufficient capacities must be provided to satisfy the demands at the extreme conditions of unbalancing. It may be costly to operate at all times a large balancer when at certain periods a small balancer would be just as serviceable, and it is therefore desirable to operate two or more balancers of the same or of different capacities in parallel, employing one or the other or both balancers, as the conditioning of unbalancing demands.

In order that each balancer may supply its share of the load and in order that the parallel operation may be satisfactory, equalizers must be employed. The low resistance shunt described with the balancer A in Fig. 1 provides a very convenient means for connecting the machines for satisfactory operation. It is customary to connect the point between the armature and series field of one machine of one balancer to a point between the armature and series field of the corresponding machine of the other balancer, and to connect in a similar manner the corresponding points of the other two machines of the balancers; thus two equalizers are required. But on account of the low resistance conductor 22, the voltage drop across the two series windings on a single balancer is the same. If two machines are provided with series fields so arranged and connected, it follows that a single equalizer connecting the two shunt conductors will serve the same purpose as the two equalizers formerly employed.

Referring now to Fig. 2, I have shown two balancers B and C connected in parallel across the conductors 26, 27 and 28 of the three wire system. The balancer B consists of two machines B' and B², having respectively the armatures 29 and 30, series fields 31 and 32, and shunt fields 33 and 34. Balancer C consists of two machines C' and C², having respectively armatures 35 and 36, series fields 37 and 38, and shunt fields 39 and 40. As in the case of the single balancer in Fig. 1, the series fields of the two balancers are connected in series between the armatures, and are connected at their common point of junction to the neutral or compensating conductor 28. The series fields of balancer B are shunted by low resistance conductor 41, the latter being connected to machine B' at a point between armature 29 and series winding 31 and to machine B² at a point between armature 30 and series winding 32. The series windings of balancer C are in a similar manner shunted by conductor 42, the latter being connected to machine C' at a point between armature 35 and series field winding 37 and to machine C² at a point between armature 36 and series field winding 38. Since the voltages across the series windings of machine B' and B² are now equal and since the voltages across the series windings of machine C' and C² are likewise equal, a single equalizer 43 joining these low resistance conductors 41 and 42 will be sufficient to insure satisfactory parallel operation. As in the preceding case each balancer is provided, in circuit with the shunt windings and between the latter, with a rheostat 44, the arm of which is connected to the neutral or compensating conductors 28.

I aim in my claims to cover all changes and modifications which do not involve a departure from the spirit and scope of my invention.

What I claim as new and desire to secure by Letters Patent is:—

1. In a multiple-voltage system of distribution, a balancer comprising dynamo-electric machines, the shunt field windings of which are connected across the main conductors in series relation, a rheostat in the shunt field circuit and between two shunt field windings, and a rheostat arm connected to a compensating conductor of said system.

2. A multiple-voltage system of distribution comprising a plurality of main and compensating conductors, a balancer comprising a plurality of dynamo-electric machines having armatures in series across said main conductors and to a compensating conductor and shunt field windings connected in series across said main conductors, and a rheostat comprising resistance elements in the shunt field circuit between two shunt field windings and a rheostat arm connected to said compensating conductor.

3. In a multiple-voltage system of distribution, a balancer consisting of compound-wound dynamo-electric machines the shunt field windings of which are connected in series relation across the main conductors, and a rheostat comprising resistance elements in the shunt field circuit and between two shunt field windings and a rheostat arm connected to a compensating conductor of said system.

4. In a multiple-voltage system of distribution, a balancer comprising a plurality of compound-wound machines having series and shunt field windings, the armature windings and series field windings being connected in series relation across the main conductors and to a compensating conductor, the shunt field windings being also connected in series relation across the main conductors, and a rheostat in the shunt circuit between two shunt windings, the arm of said rheostat being connected to a compensating conductor.

5. In a multiple-voltage system of distribution, a balancer comprising two compound-wound dynamo-electric machines connected across the main conductors and to the neutral or compensating conductor of the system, the series windings being connected directly to each other and to the neutral or compensating conductor, and a low resistance shunt around said series windings.

6. In a multiple-voltage system of distribution, a balancer comprising two dynamo-electric machines having shunt field windings and series field windings, the armatures of said machines being connected to the main conductors or legs of the system, and the series windings being directly connected together between the armatures and to the neutral or compensating conductor, and a low resistance conductor connected to a point between the armature and series field of one machine and to a point between the armature and series field of the other machine.

7. In a three-wire multiple-voltage system of distribution, a plurality of compound-wound balancers connected in parallel across the legs of the system and each connected to the neutral or compensating conductor, the series field windings of the machines of each balancer being directly connected together between the armatures thereof, a low resistance conductor shunting the series field windings of each balancer, and an equalizer connecting the shunting conductors.

8. In a three-wire multiple-voltage system of distribution, a plurality of compound-wound balancers connected in parallel across the legs of the system and to the neutral or compensating conductor, the series field windings of each balancer being connected together between the armatures thereof, and a single equalizing conductor connected to all of the balancers at points between the armature and series field winding of the respective machines thereof.

9. A multiple-voltage system of distribution, comprising main and compensating conductors, a plurality of dynamo-electric machine armatures connected thereto, shunt field windings for said armatures connected in series with each other across the main conductors, a resistance connected between said field windings, and means for connecting various points of said resistance to a compensating conductor.

10. In a multiple-voltage system of distribution, main and compensating conductors, a plurality of dynamo-electric machine armatures connected thereto, shunt field windings for said armatures, and a single rheostat for differently varying the resistances of the circuits of all of said shunt field windings.

11. In a multiple-voltage system of distribution, main and compensating conductors, a plurality of dynamo-electric machine armatures connected thereto, shunt field windings for said armatures, and a single rheostat arm for inversely varying the resistances of the circuits of two shunt field windings.

12. In a multiple-voltage system of distribution, a balancer comprising dynamo-electric machines having armatures connected across the main conductors in series relation and having shunt field windings connected across the main conductors in series relation, and a rheostat comprising resistance elements in the shunt field circuit and between two shunt field windings and a rheostat arm connected to the armature circuit.

13. In a multiple-voltage system of distribution, a balancer comprising dynamo-electric machines having armatures connected in series relation across the main conductors of the system and to a compensating conductor, and shunt field windings also connected in series relation across the main conductors, a rheostat in said shunt field circuit and between two adjacent windings, and a rheostat arm connected to the armature circuit at a point between two armatures.

14. In a multiple-voltage system of distribution, main conductors, a compensation conductor, an armature and series field winding between said compensating conductor and each of the main conductors, said series field windings being electrically adjacent to said compensating conductor, and a low resistance conductor joining the terminals of said series field windings electrically remote from said compensating conductor.

15. In a multiple-voltage system of distribution, main conductors, a compensating conductor, a plurality of balancers connected to said main and compensating conductors and having shunt and series field windings, and a single equalizer between the balancers.

16. In a multiple-voltage system of distribution, main conductors, a compensating conductor, a balancer comprising a plurality of compound-wound dynamo-electric machines connected to said conductors, and means whereby upon an inequality of current on the two sides of the compensating conductor the series field windings of the motor and generator machines take currents respectively smaller and larger than those taken by their associated armatures.

17. In a multiple-voltage system of distribution, main conductors, a compensating conductor, a plurality of balancers connected to said main and compensating conductors, each balancer including an armature and series field winding connected in series between each of the main conductors and another armature of the balancer, and a single equalizer between the balancers.

18. In a multiple-voltage system of distribution, main conductors, a compensating conductor, a plurality of compound-wound balancers, each of which includes two dynamo-electric machines having each an armature and series field winding connected in series between the compensating conductor and one of the main conductors, and means for maintaining a common potential at one armature terminal of every machine.

19. In a multiple-voltage system of distribution, main conductors, a compensating conductor, a plurality of balancers each of which includes a plurality of dynamo-electric machines having each an armature and series field winding connected in series between the compensating conductor and one of the main conductors, and means for equalizing the drop in the potential in the series field windings of all of said machines.

20. In a multiple-voltage system of distribution, main conductors, a compensating conductor, a plurality of balancers each of which includes a plurality of dynamo-electric machines having each an armature and series field winding connected in series between the compensating conductor and one of the main conductors, and means for equalizing the potential at one armature terminal of all of said machines.

21. In a multiple-voltage system of distribution, main conductors, a compensating conductor, a plurality of balancers each of which includes two dynamo-electric machines each having an armature and series field winding connected in series between the compensating conductor and one of the main conductors, and means for equalizing the potential at points between the armatures and series field windings of all of said machines.

22. In a multiple-voltage system of distribution, main conductors, a compensating conductor, a plurality of balancers each of which includes a plurality of dynamo-electric machines having each an armature and series field winding connected in series between the compensating conductor and one of the main conductors, with said series field windings electrically adjacent to the compensating conductor, a low resistance conductor connected to each balancer at points on both machines thereof between the armature and series field winding, said low resistance conductors of all balancers being electrically connected.

In testimony whereof I affix my signature, in the presence of two witnesses.

LEWIS L. TATUM.

Witnesses:
 ARTHUR F. KWIS,
 FRED J. KINSEY.